United States Patent
Borza et al.

[11] Patent Number: 6,109,112
[45] Date of Patent: Aug. 29, 2000

[54] ACOUSTIC LANDMINE PRODDING INSTRUMENT WITH FORCE FEEDBACK

[75] Inventors: Michael A. Borza; Fabio G. DeWitt, both of Ottawa, Canada

[73] Assignee: DEW Engineering and Development Limited, Ottawa, Canada

[21] Appl. No.: 09/200,924

[22] Filed: Oct. 16, 1998

[30] Foreign Application Priority Data

Oct. 16, 1997 [CA] Canada ................................ 2218461

[51] Int. Cl.[7] ................................................ G01H 11/00
[52] U.S. Cl. ............................................................ 73/661
[58] Field of Search ............................... 73/661, 658, 659; 367/910, 87; 600/459, 437; 89/1.13

[56] References Cited

U.S. PATENT DOCUMENTS

| | | | |
|---|---|---|---|
| 4,838,070 | 6/1989 | Bradley | 73/661 |
| 5,024,095 | 6/1991 | Warner | 73/661 |
| 5,379,643 | 1/1995 | Taylor | 73/654 |
| 5,445,155 | 8/1995 | Sieben | 600/443 |
| 5,672,825 | 9/1997 | Uno et al. | 73/579 |
| 5,754,494 | 5/1998 | Gallagher | 367/87 |

*Primary Examiner*—Richard A. Moller
*Attorney, Agent, or Firm*—Freedman & Associates

[57] ABSTRACT

The present invention relates to an acoustic prodding implement for the detection of land mines which provides an indication of the material an object buried in the ground. An indication of mineral material such as rock allows the operator to confidently classify the object as safe, without carefully excavating it. This saves significant time in mine clearing. The device includes a piezoelectric crystal as an acoustic transducer acoustically coupled to a transmitting probe. The piezoelectric transducer generates an acoustic wave into the probe which contacts the object and tranmits the reflected wave. A signal processor compares a signal generated by the transducer with characteristic signatures of known materials to determine a match within predetermined limits. The implement includes a shock resistant coupler to maintain acoustic coupling between the transducer and the probe in response to shock or vibration. The implement may farther include a capacitive force sensor for providing an indication of a force at the tip of the probe as it is contacted with an object. The implement may filter include a metal detector removeably supported on the probe.

16 Claims, 9 Drawing Sheets

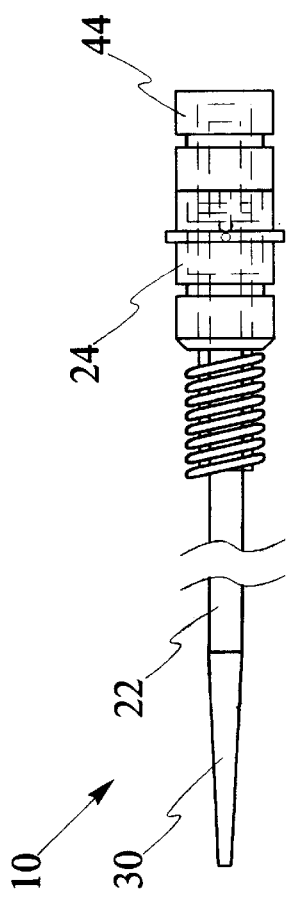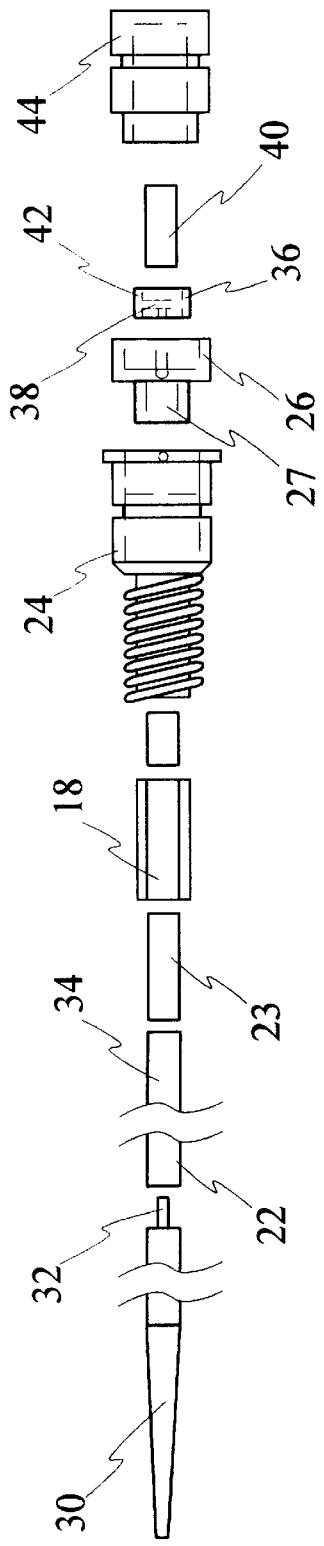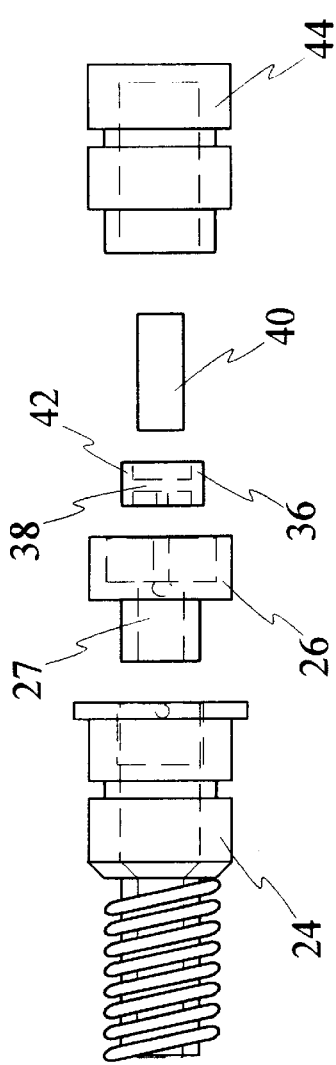

ACOUSTIC LANDMINE PRODDING INSTRUMENT WITH FORCE FEEDBACK

FIELD OF THE INVENTION

This invention relates generally to prodders having an acoustic detecting capability to probe the ground for buried explosive devices such as landmines and the like having sufficient structural strength to withstand the significant physical wear of a manual tool, and more particularly to a method and device for providing force feedback to the prodder or the user of the device.

BACKGROUND OF THE INVENTION

Humanitarian land nine removal (that is complete manual minefield clearing) involves very time consuming and dangerous human excavation of a field. Currently a simple hand prodder with a short metal probe is used to investigate surface soils "by feel" for objects. If an object is encountered by the prod having a characteristic size and depth, it must be carefully excavated to determine whether it is a mine. In the case of a mine, it will be defused or detonated. In practice, however, many objects are painstakingly excavated which are not mines, but rocks, pieces of metal or other material. Metal detectors may be used to locate metal objects, however, many mines are not metal, but plastic or even wood.

Minimum metal content (MMC) mine detectors having a search head and circuitry for detecting buried non-metallic and metallic land mines are well known. For example, U.S. Pat. No. 4,016,486 in the name of Pecori assigned to the United States of America by the Secretary of the Army, discloses such circuitry. An MMC detector includes electronic circuitry to assist a human operator to determine the nature of a solid obstruction encountered below the surface of the ground. Typically, metals and rocks are distinguished from one another. Metals are potential land mines. A prodder capable of distinguishing threats, from non-threats reduces stress and fatigue of a human operator and speeds up the process of clearing an area of buried land mines. The search head is typically a UHF balanced bridge detector which is unbalanced by passing the search head over a soil area which has a dielectric constant different from the background. Such a condition exists when passing over a mine.

Currently, instrumented prodders are known having ultrasonic means in the form of an ultrasonic transducer at or near the probe tip that are used for characterization of buried obstructions; this device can be used in conjunction with an MMC detector wherein the MMC detector first detects the presence of metal within or about the ground indicating the vicinity of a land mine, and, wherein the instrumented prodder is used to probe the earth in the vicinity of the suspected land mine, the location of which may have been isolated using the MMC detector.

A hand held prodder having a probe in the form of an elongate, preferably non-magnetic rod including a gripping handle disposed at one end is currently known. The design of the probe is based partially upon a Split Hopkinson Pressure Bar (SHPB) apparatus. In the apparatus a compression wave or high frequency elastic mechanical pulse is delivered via a to a sample wherein a portion of the wave is reflected. Mechanical impedance is a characteristic of a material. An incident wave launched at a material will be reflected and/or transmitted from or through the material, in dependence upon the characteristics of the material. The effect of mechanical impedance on a SHPB apparatus in three instances is described hereafter:

Firstly and obviously, if the mechanical impedance of a sample under test is the same as that of an incident bar in the SHPB, there will be no reflection as the sample will be displaced in a same manner as the bar itself as the compression wave is delivered. The displacement of the end of the bar is directly proportional to the strain measured ($\epsilon$).

Secondly when the mechanical impedance of a sample is considerably greater than that of the bar, a sample's mechanical impedance tends toward being infinite and substantially the entire wave is reflected.

In a third instance when the mechanical impedance is zero, in the absence of a sample, the reflected wave is tensile but of equal magnitude to the incident wave. The phase of the wave is shifted by $\pi$ and the net stress is zero; the relative displacement at the bar end equals twice that for the first instance ($2\epsilon$).

In a SHPB device, once the relative displacement of the bars is known, the displacement of the sample is ascertained. Taking into account Young's Modulus (E) and the displacement of the bar, the imposed stress can be calculated, wherein the force applied is equal to the product of the stress and the cross-sectional area of the bar.

Since the loading on the sample becomes equal after a short time, the analysis may be somewhat simplified. Strain results may be used for only the incident bar; or alternatively, the striker bar may be directed to impact directly on the sample, and the transmitter bar alone may be used to define the sample characteristics.

It has been found that plastics, minerals and metals may be discerned from one another by using this approach.

It has been further found that a hand held prodder having a rod modified to be analogous to the incident bar of a SHPB may be used to detect or discern metal, plastic and rocks.

The prodder rod is provided with one or more piezoelectric transducers capable of generating an acoustic wave into the rod and for detecting reflected waves from an object contacting the end of the rod. Conveniently, signal processing means are coupled to the transducers and are provided for analyzing the detected reflected waves for determining the characteristics of the object; more especially distinguishing landmines from inert rocks. The signal processor establishes measurements of the frequency-time-amplitude characteristic of the object. The reflected waves are compared with known characteristic signatures of a plurality of materials to attempt to ascertain a match within predetermined limits.

Although instrumented prodders of this type may function satisfactorily in many instances, they suffer from a problem related to the fact that acoustic coupling at the obstruction is a function of the applied force to the probe end.

Preferably, enough force will be applied to the probe end such that characterization of the obstruction can occur without causing detonation; and, preferably, a relatively consistent force will be applied to the probe end such that an accurate determination as to the character of the buried obstruction can be made. However, if too little force is applied at the probe end, a poor reading may result and a mine in the vicinity of the probe may go undetected. Too much force applied at the probe end in the vicinity of a land mine may inadvertently detonate the mine.

The critical feature for reliable performance of the acoustic probe is the coupling between the acoustic transducer and the transmitting rod probe. To transmit waves without distortion, the probe must be free of imperfections such as interruptions (air pockets) or resonance impeding contacts (such as screws or welds) which would dampen the transmission. Electrical contact likewise will affect the transmission. Thus it is necessary to couple the probe to the transducer with sufficient rigidity to withstand use as a manual tool without the use of screws, welds or other structural discontinuities, and further to operatively couple the piezoelectric transducer to the probe without electrical interference. The transducer is also sensitive to distortions caused by interfering resonance between elements of the assembly, and accordingly must be physically supported without reducing its performance.

These prods are subjected to significant force and wear in the course of normal use. The device must be able, at least, to withstand the force of the weight of the operator. The direction of the force will often result in significant flexure of the rod. Good connection between the transducer and the rod, however, is essential. This connection must withstand any flexure without any separation, or the detection will not be reliable. In the design proposed in the prior art, the transducer is mechanically coupled by gluing the crystal to a disk-shaped ceramic insulator, which is in turn glued to the coupling end of the rod. This design has not proved reliable. The coupling is susceptible to damage. The glue, which must form the structural connection as well as the acoustic connection, is particularly subject to shear due to shock and vibration, as well as shifting induced by thermal effects and other disturbances. If the device is dropped, for instance, no structural lateral support is provided to the transducer or the coupling. However, lateral support must be provided without dampening the acoustic transmission.

Further the prod itself is subject to significant physical wear as a digging tool. Under regular use, the simple prod (without acoustic sensitivity) has an expected lifetime of three months. The cost of replacing acoustic detectors at this rate is very high. However, the sensitivity of the acoustic coupling makes replacing the rod in the detector difficult. This replacement could not be made reliably in the field.

SUMMARY OF THE INVENTION

It is therefore an object of the invention to provide a method and device, which overcome the aforementioned problems, related to too much force, too little force, or a varying force being applied to the probe end while in use, and to overcome structural weaknesses in the prior art which limit its reliability and strength.

It is a further object of the invention to provide an acoustic prodder incorporating an integral metal detector.

Accordingly, the present invention comprises a prodding implement for determining acoustic characteristics of objects comprising:

an acoustically coherent transmitting probe having a detecting end and a coupling end;

an acoustic transducer for generating an acoustic emission, and for receiving an acoustic wave and generating an electrical signal;

an acoustic coupling for operatively connecting the probe and the transducer including:
receiving means for receiving the coupling end of the probe having an internal probe contact surface and lateral support means for surrounding a portion of the contact end of the probe,
receiving means for receiving an end of the transducer having an internal transducer contact surface opposite and acoustically contacting the probe contact surface and lateral support means for surrounding a portion of the transducer;
sealing means for contact between the coupling end of the probe and the probe contact surface and between the transducer and the transducer contacting surface for acoustically transparent coupling; and processor means for comparing known acoustic wave patterns to a received wave pattern;

wherein acoustic coupling is provided over the fill contact surfaces, substantially without distorting acoustic wave transmission.

In a preferred embodiment of the present invention the prodder further includes a detachable, replaceable portion at the detecting end having connection means for acoustically transparent coupling with the detecting end portion of the probe.

In a still further preferred embodiment the present invention includes means for providing a signal that varies with a change in force applied to the detecting end.

In a still further preferred embodiment the present invention includes a metal detector removeably supported on the probe.

It is an advantage of the present invention that a reliable coupling may be insured between the transmitting probe and the acoustic transducer.

It is a further advantage that worn probe tips may be replaced economically without compromising the acoustic quality of the probe.

It is an additional advantage of the present invention to provide an indication of force applied to unknown objects to help prevent accidental detonation of a land mine, and to provide better reliability of the acoustic detection information provided by the detector.

It is still a further advantage of the present invention that a metal detector may be incorporated into the implement, thus reducing the number of tools which must be carried into a mine field and placed about the operator.

These and further advantages will be apparent to persons of skill in the art with reference to the following detailed description and exemplary drawings.

BRIEF DESCRIPTION OF THE DRAWINGS

Exemplary embodiments of the invention will now be described in conjunction with the drawings, in which:

FIG. 7 shows an acoustic prod according to the present invention;

FIG. 8 shows the elements of the embodiment of FIG. 7 in an exploded view;

FIG. 8A is an enlarged view of a portion of FIG. 8;

DETAILED DESCRIPTION

Figure 1:
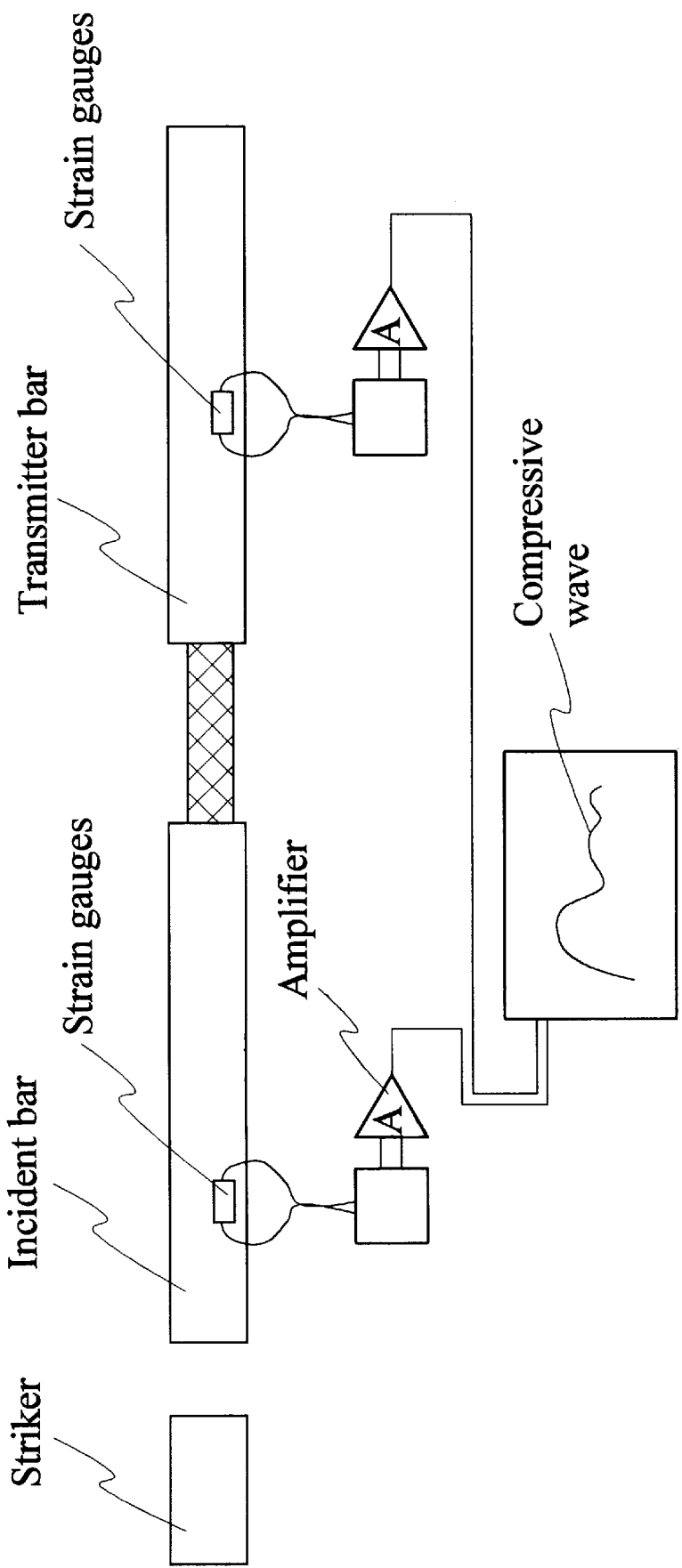
FIG. 1 is a prior art circuit diagram of a Split Hopkinson Pressure Bar device.

In prior art FIG. 1 a specimen sample is shown juxtaposed between an incident bar and a transmitter bar. A strain gauge disposed on each bar provides a signal to signal processor as is described heretofore.

Figure 2:
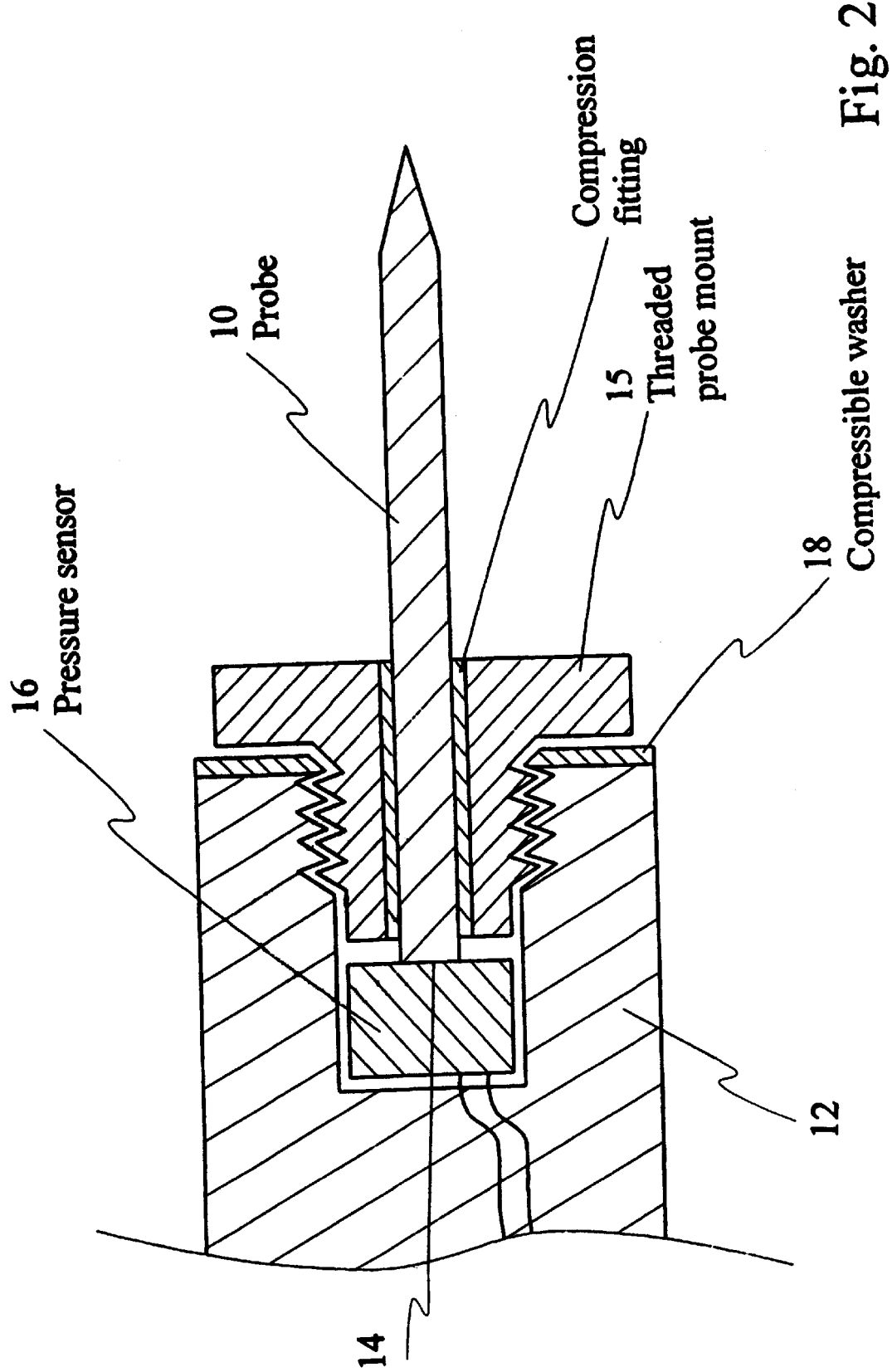
FIG. 2 is a diagram of a probe with force sensor in accordance with the invention.

Referring now to FIG. 2, an ultrasonic probe 10 for determining the character of a buried obstruction is shown in a movable mounting within housing 12. An inward end 14 of the probe 10 is coupled directly to a force sensor 16. A portion of the probe 10 shaft is tightly coupled via a compression fitting with a probe mount 15. A spacer in the form of a compressible washer 18 is disposed between an inside face of a flange of the threaded probe mount and an outside face of the housing. Intermediate the probe mount 15 and the probe tip at its outward end, resides a circuitry for controlling ultrasonic receiver and transmitter transducers for providing and receiving an ultrasonic signal. In operation, a pulse train is launched down the rod; the transducer is subsequently switched to receive mode just prior to the return echo traversing the rod length. The transducer is most conveniently provided in the form of a piezoelectric crystal affixed to a first end of the probe shaft 10. Upon application of an electric field to the crystal, a strain will occur and a resultant mechanical energy is driven into the shaft end. Conversely, when the crystal is mechanically stressed an electric charge is produced. The crystal is electrically insulated from the probe shaft 10. A suitably programmed digital signal processor (DSP) is provided which receives digital signals from an analog to digital converter coupled to the crystal.

In operation, the DSP stores captured reflected data in a memory device. The stored data is conditioned using a stepping fast Fourier transform (FFT); the data is analyzed for frequency-time-amplitude information. A 256 point FFT from a 1024 sample is advanced in 128 sample steps producing 7 time slices of FFT data. The important characteristics corresponding to the material are typically located within approximately 15 harmonics of the FFT data.

Calibration for the probe absent a sample is performed to take into account the specific response of the probe itself including particular characteristics such as wear on the probe tip, debris that may be present on the probe, etc. This calibration data is then subtracted from the "real" acquired data in the presence of a sample.

Ie operation, the ultrasonic probe 10, in accordance with the invention, works in the following manner: The probe tip or prodder rod is inserted into the ground. Ultrasonic pulses are alternately launched and return echoes received by the instrumentation electronics. The return echo is modified by contact with obstructions encountered at the rod tip. The modified echoes are categorized broadly as being echoes reflected from plastic, rock or metal obstructions. Then the user is presented with a visual indication, preferably in the form of a light pattern indicating the type of obstruction. The return echo is also modified weakly by the force applied to the rod tip at the obstruction. The modification is sufficient to cause an incorrect classification; for example confusing rock for metal. By measuring the force applied to the rod tip, this effect may be compensated for. In a preferred embodiment interpolation on a force nomagraph is performed to produce a corrected echo reading that is zero-based. In less desired embodiments that are simpler to implement, an indication of a force being applied within a predetermined range may be provided, indicating an acceptable result; or an indication that excessive force is being applied, resulting in a spurious reading may be provided to the user; thereby letting her/him know that the result is not reliable. However, although these embodiments may be easier to implement, they introduce the possibility that a mine is accidentally detonated by an operator attempting to meet the force conditions imposed by the thresholds.

As pressure is applied to the tip end, the inward end 14 is forced against the fore sensor 16. As a result, an electrical signal is produced that is proportional to the applied force at the probe tip. This signal can be used to sound an alarm when too much force is applied. Alternatively, the intensity of the alarm may increase/decrease or provide a variable indication, dependent upon the amount of force applied may be provided. Alternatively, a visual indication of force applied in the form of a plurality of LEDs or similar indicators may be provided.

Figure 3:
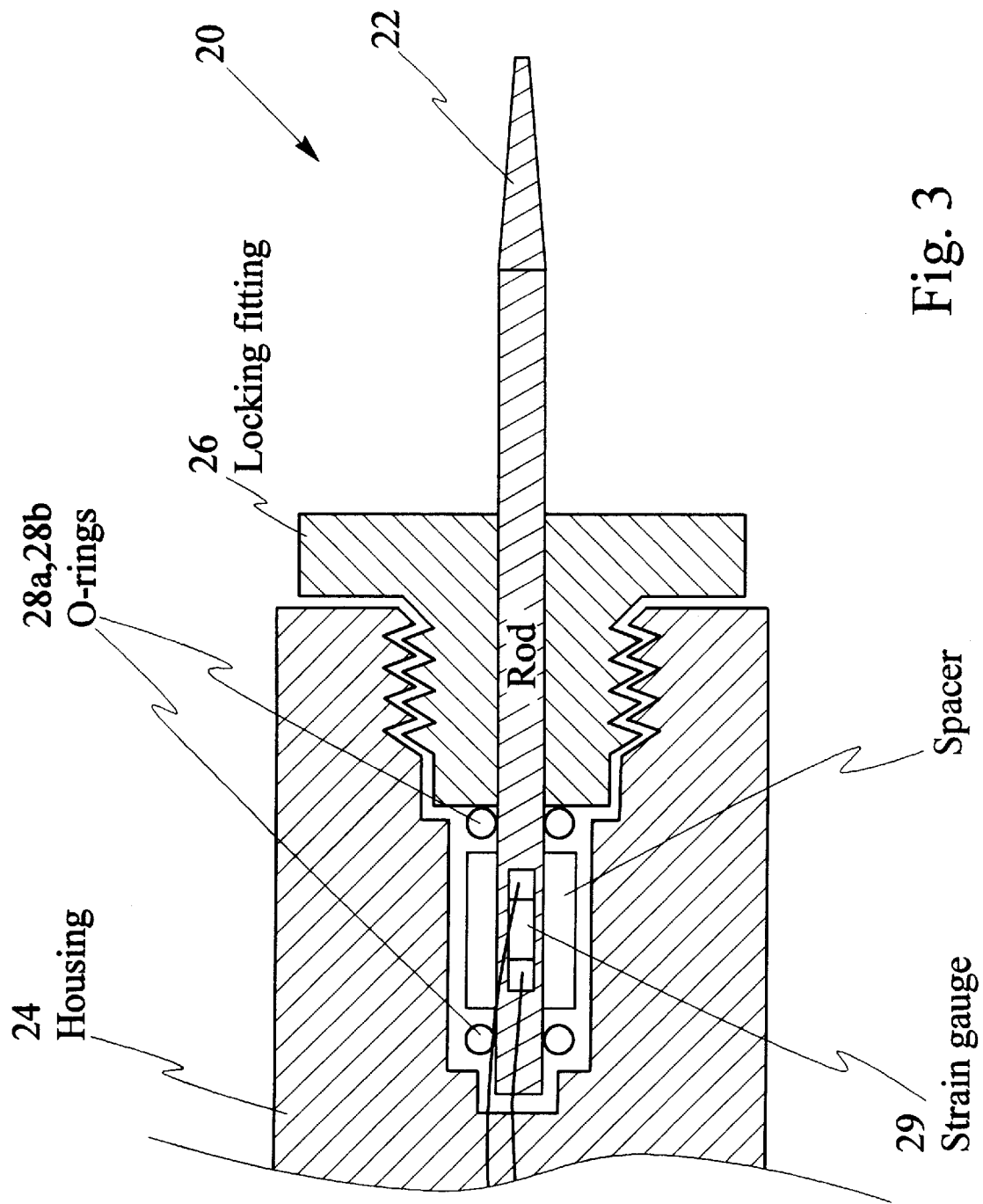
FIG. 3 is a diagram of an alternative embodiment of a probe having a rod coupled to a strain gauge cushioned by compressible o-rings.

Referring now to FIG. 3, an alterative embodiment of probe and force sensor is shown, wherein a probe 20 includes a probing rod 22, a housing 24 for receiving a non-probing end of the rod. A threaded lock fitting screw 26 having a bore through its shaft for slidably receiving the probe 20, fits tightly within the housing end and in that position lightly compresses a pair of o-rings 28a and 28b. A force transducer in the form of a strain gauge 29 is disposed along the probe between the two o-rings 28a and 28b. Alternatively, and advantageously, the strain gauge may be disposed along the rod within a void housed by the threaded lock fitting screw 26. By so doing, a more accurate and more precise determination of force upon the rod may be calculated.

Of course, other means may be envisaged for measuring or determining a force upon an end of the probing rod 22. For example, displacement of the rod with a sleeve may be used as an indicator of force. Or alternatively by measuring a compression of a compressible member coupled with the probing rod 22.

Figure 4:
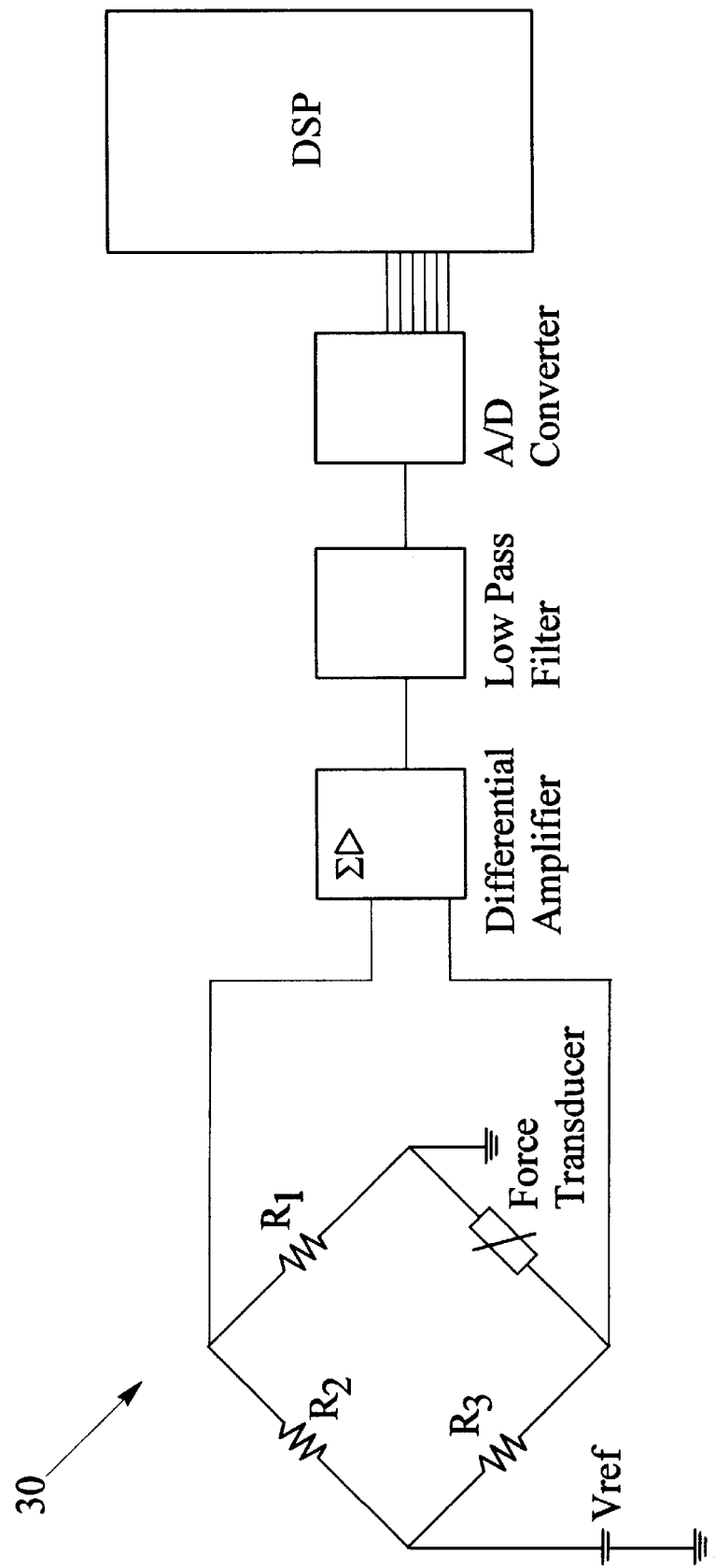
FIG. 4 is circuit diagram for a measurement circuit for a force transducer.

FIG. 4 shows a measurement circuit for a force transducer. The circuit 30 comprises a bridge wherein three known resistors $R_1$ $R_2$ with $R_3$ are coupled with a resistive force transducer $R_{Forcetransducer}$. A differential amplifier compares outputs from divider network $R_1$ $R_2$ with $R_3$ $R_{Forcetransducer}$ of the bridge. This output is then filtered by a low pass filter and is converted to a digital signal and is provided to a signal processor. The processor may be suitably programmed to determine when a force exceeding a predetermined allowable threshold has been exceeded.

Figure 5:
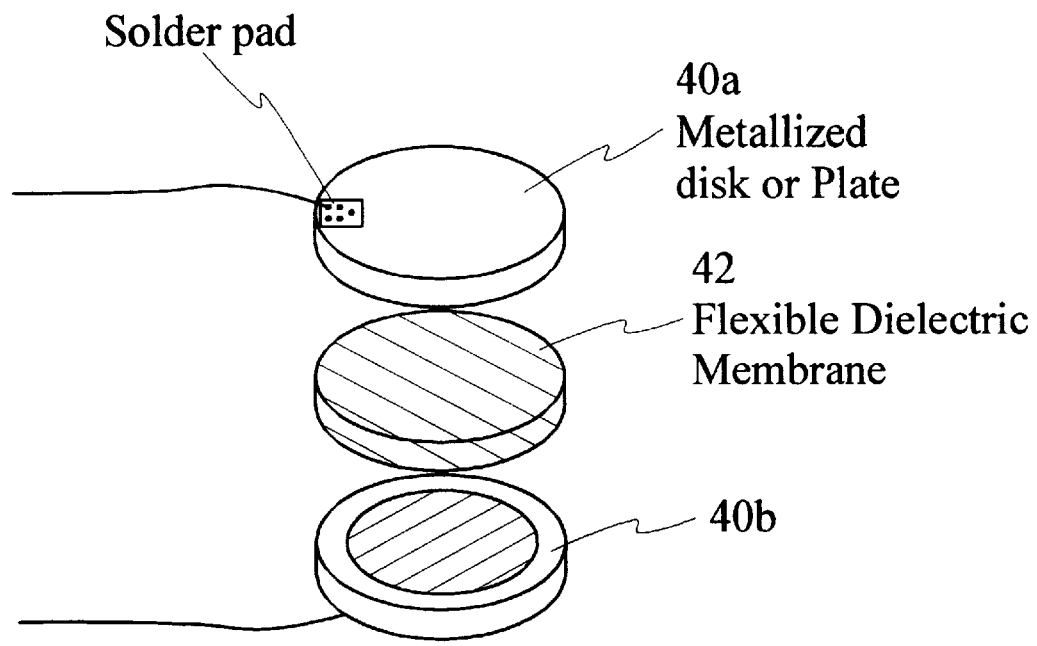
FIG. 5 is diagram of a capacitive force sensor having two metallized plates.

In FIG. 5, a capacitive force sensor is shown that is preferable to the force sensor described heretofore, based on more costly strain gauge technology. Furthermore the capacitive sensor in accordance with this invention, is less fragile than the aforementioned strain gauge type.

Now turning to FIG. 5 the capacitive force sensor is shown to have two metal or metallized plates 40a and 40b separated by a flexible dielectric membrane 42. The plates may be manufactured by use of conventional circuit board technology, thereby facilitating the manufacture of plates in a plurality of shapes and sizes. Furthermore, such plates 40a and 40b can be conveniently soldered Lo other portions of the circuit. The flexible dielectric membrane 42 is chosen to have a high permittivity and must simultaneously exhibit a relatively large mechanical strain rate in compression. For example, synthetic rubber, polyethylene, and some plastics may be used. Synthetic rubber is especially suitable providing thermal insensitivity over a wide temperature range. Alternatively, thin-film plastic typically provides a large capacitance density, reducing sensitivity of the force measurement to parasitic effects.

Figure 6:
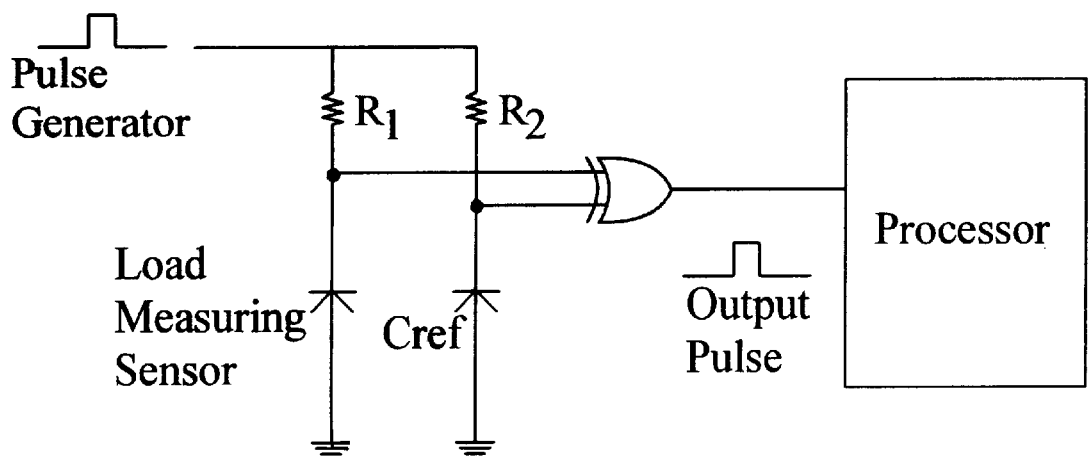
FIG. 6 is circuit diagram of a measurement circuit for use with the capacitive force sensor shown in FIG. 5.

FIG. 6 shows a measurement circuit for use with the capacitive force sensor of FIG. 5. In operation, this circuit measures an applied load (to the capacitive plate 40a) by comparing a nominal capacitance $C_{ref}$ with the capacitance measured across the dielectric 42 of the force sensor shown in FIG. 4. In FIG. 6 a pulse is provided at an input terminal and distributed at a first junction to a first leg including a resistor $R_1$ in series with a capacitive force sensor capacitor; and to a second leg to a resistor $R_2$ in series with a fixed reference capacitor $C_{ref}$. This is particularly suitable for computerized applications, where the pulse generating, function may be provided by the processor itself. By selecting $R_1$, $R_2$, and $C_{ref}$ appropriately, the time constant $R_2*C_{ref}$ will match the time constant due to the combination of $R_1$ and the sensor. Thus, the duration of the output pulse will be zero when no load is applied. When a load is applied to the sensor capacitor, the time constants will no longer match, producing an output pulse with a duration proportional to the applied load. Similarly, sensitivity of the measurement to ambient temperature is easily compensated for.

In construction, a probe 10 as shown in FIGS. 7 and 8 is preferred. This probe 10 may be mounted in a handle connected with a force sensor, or without a force sensor. The prodding implement is primarily a manual digging tool. To withstand the rigors of normal use and continue to provide reliable response, the assembly must be flexible, while still providing sufficient strength, particularly to the acoustic coupling between the transducer and the probe. The probing rod 22 includes a detachable section at the detecting end, tip 30 which is joined to the rod 22 by threaded coupling 32. The threaded coupling 32 must be acoustically transparent, and is carefully machined for full contact. A lubricating compound is applied to the threads to eliminate any air pockets. The rod 22 is mounted in housing 24 by a compression fitting washer 18, such as of rubber, which provides flexible secure and non-conducting contact with the rod 22. The rod 22 must also be insulated from any electrical contact with the housing 24, and is surrounded by a shrink tubing 23 also of flexible non-conducting material. Threaded lock fitting screw 26 compresses the washer 18 within housing 24. The coupling end 34 of rod 22 is located within a central bore 27 in the fitting screw 26.

Figure 8B:
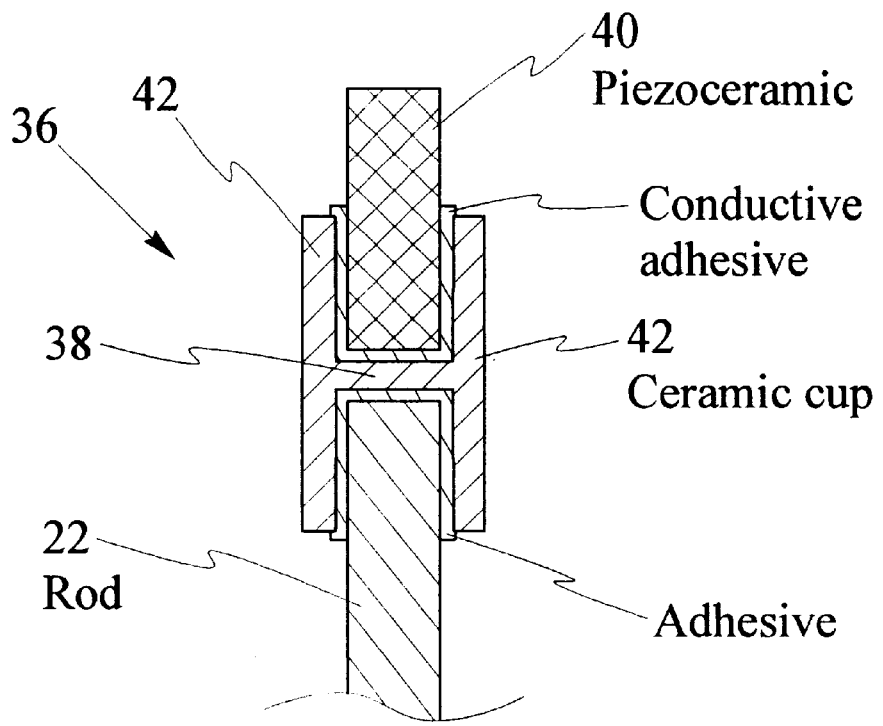
FIG. 8B is a detailed view in cross section of the coupling portion of the probe assembly.

An insulating coupler 36 seen more clearly in FIGS. 8A and 8B includes a central insulating wall 38 having opposite contact surfaces for contacting the coupling end 34 of the rod 22 and the transducer 40. The coupler 36 further includes lateral supporting walls 42 which form a pair of opposite cups for receiving the rod end and the transducer. In assembly the coupling end 34 of the rod 22 is glued to one contact surface of the insulating wall 38 to provide sealing contact for transmission of acoustic waves. In addition adhesive provides sealing contact with the lateral walls 42 to provide a structurally sound and acoustically transparent is coupling. Likewise, the transducer 40 is glued to the opposite contact surface of the insulating wall 38 and lateral walls 42 for complete acoustic sealing contact. The coupler 36 provides electrical insulation for the rod 22 from the transducer 40. Further it provides structural support for the connection that the probe 10 may withstand being dropped without damaging the acoustic coupling.

A cap 44 fits over the transducer 40 and coupler 36 to seal the assembly from air and moisture. An end surface 46 is convenient for mating with the strain gauge 29 (not shown in this embodiment) to provide a direct indication of force applied to the tip.

Figure 9:
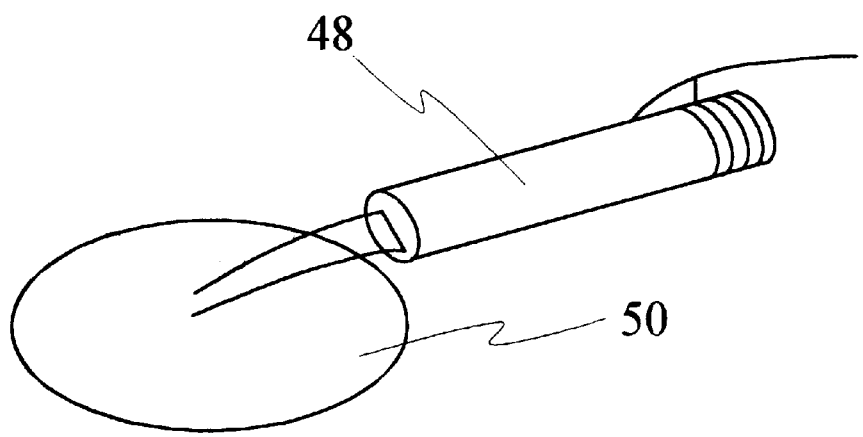
FIG. 9 shows a sheath for the probe incorporating a metal detector and operative connection to the probe housing.

As shown in FIG. 9, a sheath 48 is provided for protecting the rod 22 when not in use, which connects with threads or suitable mechanical engagement to the housing 24. Advantageously, a metal detector 50 may be mounted on the sheath 48 with electrical connections through the housing 24 to the power source, control mechanism and indicators in the handle or on a separate control module. This reduces the number of implements which must be carried into a mine field and which may inadvertently be placed in an unsecured location.

Figure 10:
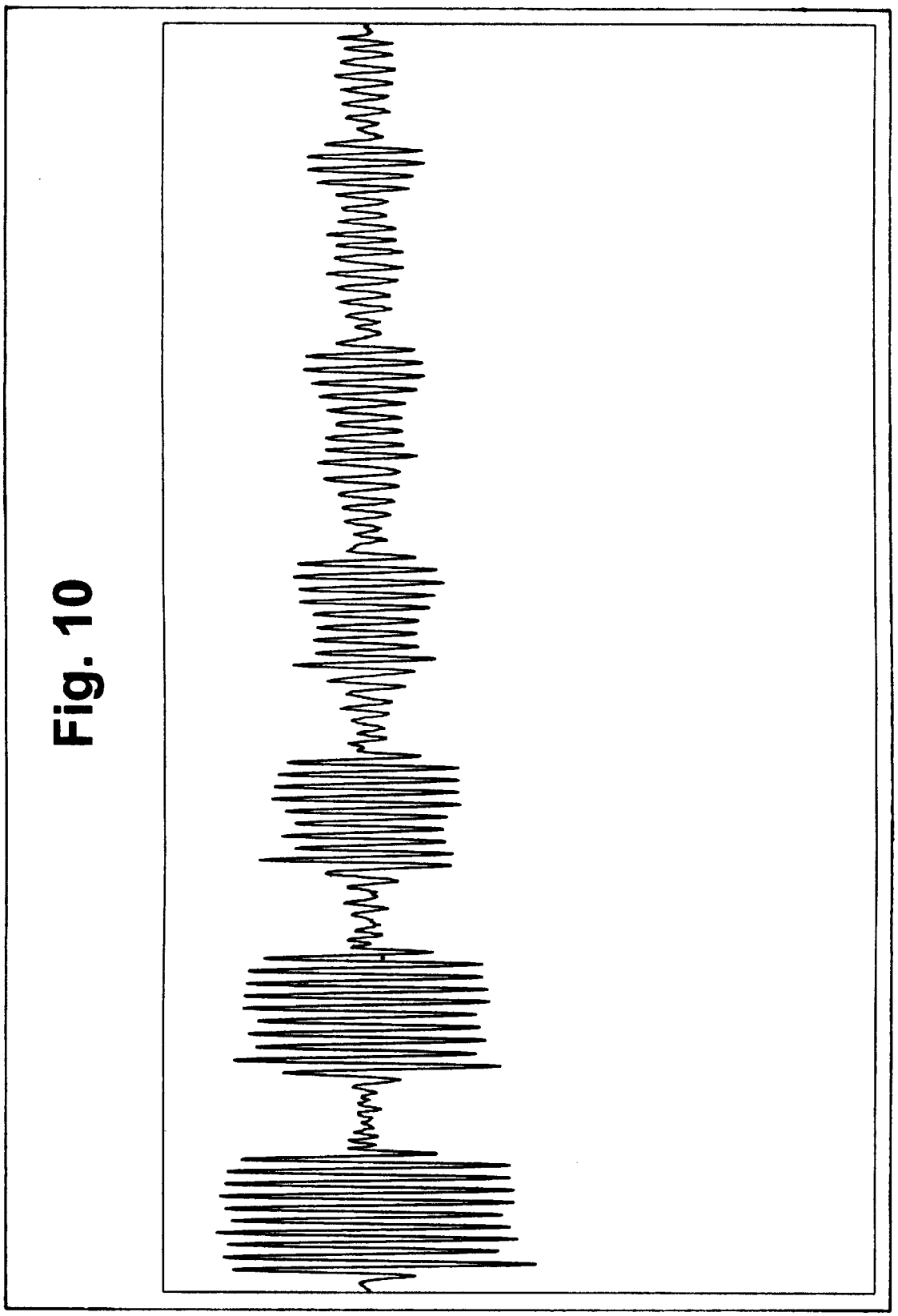
FIG. 10 is a graph illustrating a response disrupted by ringing of the coupling transducer cup; and, FIG. 11 is a graph illustrating a response of a properly constructed probe assembly.

FIG. 10 illustrates a response of a probe assembly where full sealing contact is not provided within the ceramic coupler 36. Side walls 42 are not sealed to the rod 22 and transducer 40. The response shows ringing interference in the signal caused by vibration of the side walls 42.

Figure 11:
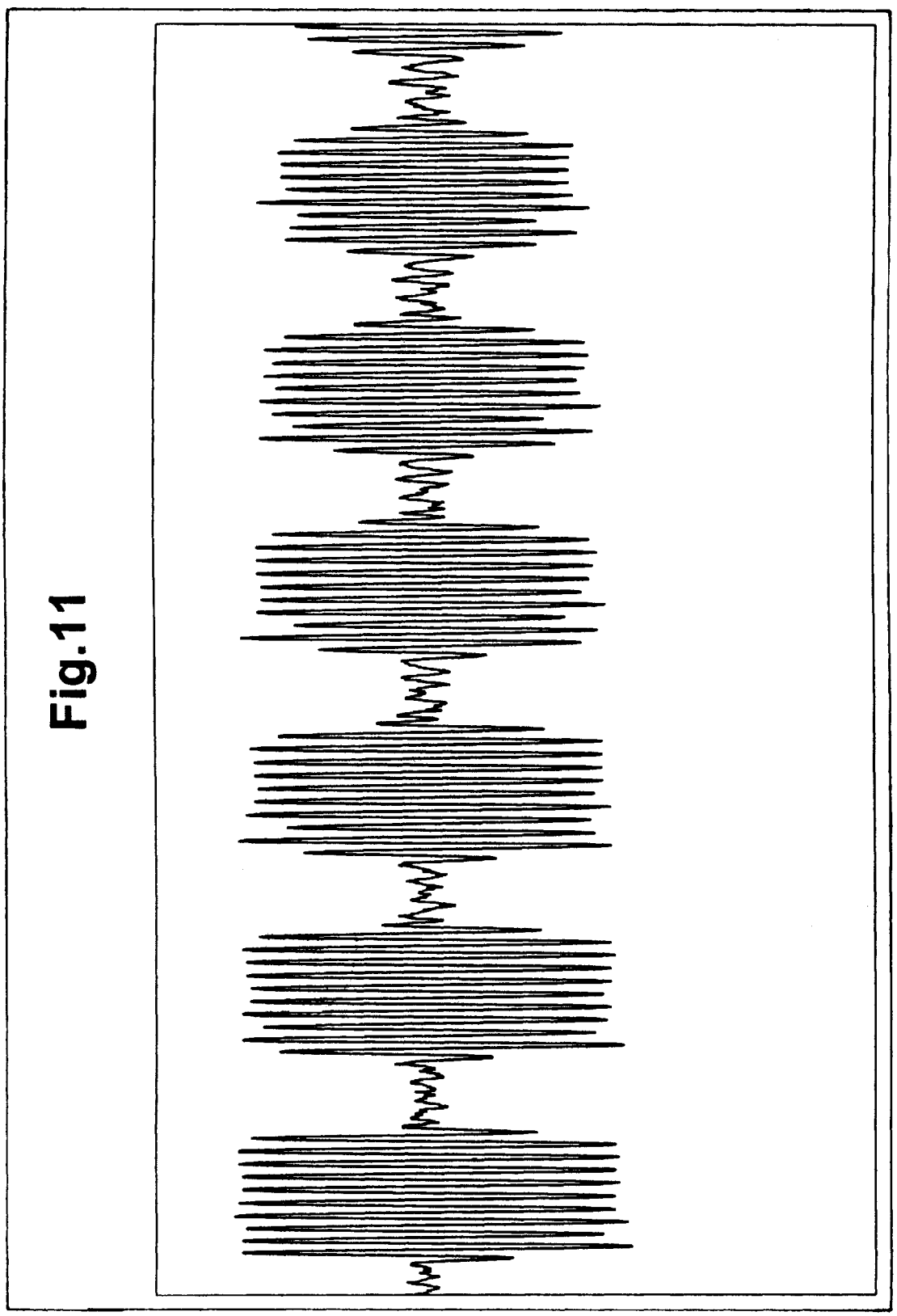

By contrast a response is illustrated in FIG. 11 showing generally rectangular pulse groups separated by low noise dead bands obtained from a properly constructed probe assembly 10. Adhesive coupling is made between the rod 22 and contact surface of insulator 38 and side walls 42. Adhesive coupling is also made between the transducer 40 and insulator 38 and side wall 42 surfaces. Provision must be made to eliminate air pockets from the joints and excessive adhesive mass. Air bubbles in the coupling surfaces, surface irregularities, and unsealed surfaces in the joined elements all result in degradation of the signal.

Of course, numerous other embodiments may be envisaged, without departing from the spirit and scope of the invention.

What is claimed is:

1. A prodding implement for determining acoustic characteristics of objects comprising:

an acoustically transmitting probe having a detecting end and a coupling end;

an acoustic transducer having a first end, for generating an acoustic emission, and for receiving an acoustic wave and generating an electrical signal in dependence thereon;

an electrically insulating acoustic coupler for operatively connecting the probe and the acoustic transducer including;

a first receiving end for receiving the coupling end of the probe and having an internal probe contact surface for contacting the coupling end of the probe when received and lateral support means for surrounding a portion of the coupling end of the probe, a second receiving end for receiving the first end of the transducer and having lateral support means for surrounding portion of the transducer and an internal transducer contact surface opposite and acoustically contacting the internal probe contact surface;

sealing means for contact between the coupling end of the probe and the internal probe contact surface and between the first end of the transducer and the internal transducer contact surface for acoustically transparent coupling of the coupling end of the probe to the internal probe contact surface and of the first end of the transducer to the internal transducer contact surface; and processor means for comparing known acoustic wave patterns to a received wave pattern, wherein acoustic coupling is provided over the internal probe and transducer contact surfaces, substantially without distorting acoustic wave transmission.

2. A prodding implement as defined in claim 1, wherein the acoustic coupler comprises a first ceramic cup having the first receiving end dimensioned to receive an end portion of probe and a second integral ceramic cup having the second receiving end and opposite the first ceramic cup dimensioned to receive an end portion of the transducer, each ceramic cup having side walls to provide lateral support for the coupling.

3. A prodding implement as defined in claim 2, wherein sealing means comprises adhesive for providing sealing contact between the contact surfaces, the side walls and the coupling end of the probe and the first end of the transducer without substantial dampening effect on transmission of the acoustic wave.

4. A prodding implement as defined in claim 3, wherein the probe includes a detachable, replaceable portion at the detecting end having connection means for acoustically transparent coupling with the detecting end portion of the probe.

5. A prodding implement as defined in claim 4, wherein the connection means comprises a mating thread for full contact connection.

6. A prodding implement as defined in claim 3, further including a sensor for providing art indication of a force at the detecting end as it is placed beneath the ground surface.

7. A prodding implement as defined in claim 3, wherein the acoustic coupling comprises an insulating member having a substantially H-shaped profile in cross-section.

8. A prodding implement as defined in claim 7, wherein the member is formed of ceramic.

9. A prodding implement as defined in claim 3, wherein the sensor includes means for providing a signal that varies with a change in force applied to the detecting end.

10. A prodding implement as defined in claim 9, wherein said force is pressure.

11. A prodding implement as defined in claim 10, further including means for indicating to a user, when excessive force is being applied.

12. A prodding implement as defined in claim 10, including means for indicating to a user, when a variable force is being applied.

13. A prodding rod as defined in claim 11, wherein the means for indicating force provides a visual indication.

14. A prodding rod as defined in claim 11, wherein the means for indicating an excessive force includes a capacitive force sensor.

15. A prodding implement as defined in claim 9, including a metal detector removeably supported on the probe.

16. A prodding implement as defined in claim 15, wherein a protective sheath is provided in association with the probe and includes the metal detector and operative connection to a handle of the implement including drive means for the metal detector.

* * * * *

UNITED STATES PATENT AND TRADEMARK OFFICE
CERTIFICATE OF CORRECTION

PATENT NO. : 6,109,112
DATED : August 29, 2000
INVENTOR(S) : Borza et al.

It is certified that error appears in the above-identified patent and that said Letters Patent is hereby corrected as shown below:

Title page, item [57],
ABSTRACT,
Line 17, "farther include" should read -- further include --,
Line 19, "may filter include" should read -- may further include --.

Column 3,
Line 59, "receiving means" should read -- first receiving end --,
Line 63, "receiving means" should read -- second receiving end --.

Column 4,
Line 7, "the fill contact" should read -- the full contact --.

Column 5,
Line 51, "Ie operation" should read -- In operation --.

Column 6,
Line 1, "that arc" should read -- that arc --,
Line 63, "soldered Lo" should read -- soldered to --.

Column 7,
Line 13, "in series" should read -- in series --,
Line 55, "scaling contact" should read -- scaling contact --,
Line 58, "transparent is coupling" should read -- transparent coupling --.

UNITED STATES PATENT AND TRADEMARK OFFICE
CERTIFICATE OF CORRECTION

PATENT NO. : 6,109,112
DATED : August 29, 2000
INVENTOR(S) : Borza et al.

It is certified that error appears in the above-identified patent and that said Letters Patent is hereby corrected as shown below:

Column 8, claim 1,
Line 44, "including;" should read -- including: --,
Line 52, "surrounding portion" should read -- surrounding a portion --.

Column 9, claim 6,
Line 24, "providing art indication" should read -- providing an indication --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,109,112
DATED : August 29, 2000
INVENTOR(S) : Borza et al.

It is certified that error appears in the above-identified patent and that said Letters Patent is hereby corrected as shown below:

Title page,
Item [57] ABSTRACT,
Line 17, "farther include" should read -- further include --.
Line 19, "may filter include" should read -- may further include --.

Column 3,
Line 59, "receiving means" should read -- first receiving end --.
Line 63, "receiving means" should read -- second receiving end --.

Column 4,
Line 7, "the fill contact" should read -- the full contact --.

Column 5,
Line 51, "Ie operation" should read -- In operation --.

Column 6,
Line 1, "that arc" should read -- that are --.
Line 63, "soldered Lo" should read -- soldered to --.

Column 7,
Line 13, in scrics" should read -- in series --.
Line 55, scaling contact" should read -- sealing contact --.
Line 58, "transparent is coupling" should read -- transparent coupling --.

Column 8, claim 1,
Line 44, "including;" should read -- including: --.
Line 52, "surrounding portion" should read -- surrounding a portion --.

UNITED STATES PATENT AND TRADEMARK OFFICE
CERTIFICATE OF CORRECTION

PATENT NO. : 6,109,112
DATED : August 29, 2000
INVENTOR(S) : Borza et al.

It is certified that error appears in the above-identified patent and that said Letters Patent is hereby corrected as shown below:

<u>Column 9, claim 6,</u>
Line 24, "providing art indication" should read -- providing an indication --.

This certificate supersedes Certificate of Correction issued November 13, 2001

Signed and Sealed this

Nineteenth Day of March, 2002

Attest:

JAMES E. ROGAN
*Attesting Officer*     *Director of the United States Patent and Trademark Office*